United States Patent Office 3,190,401
Patented June 22, 1965

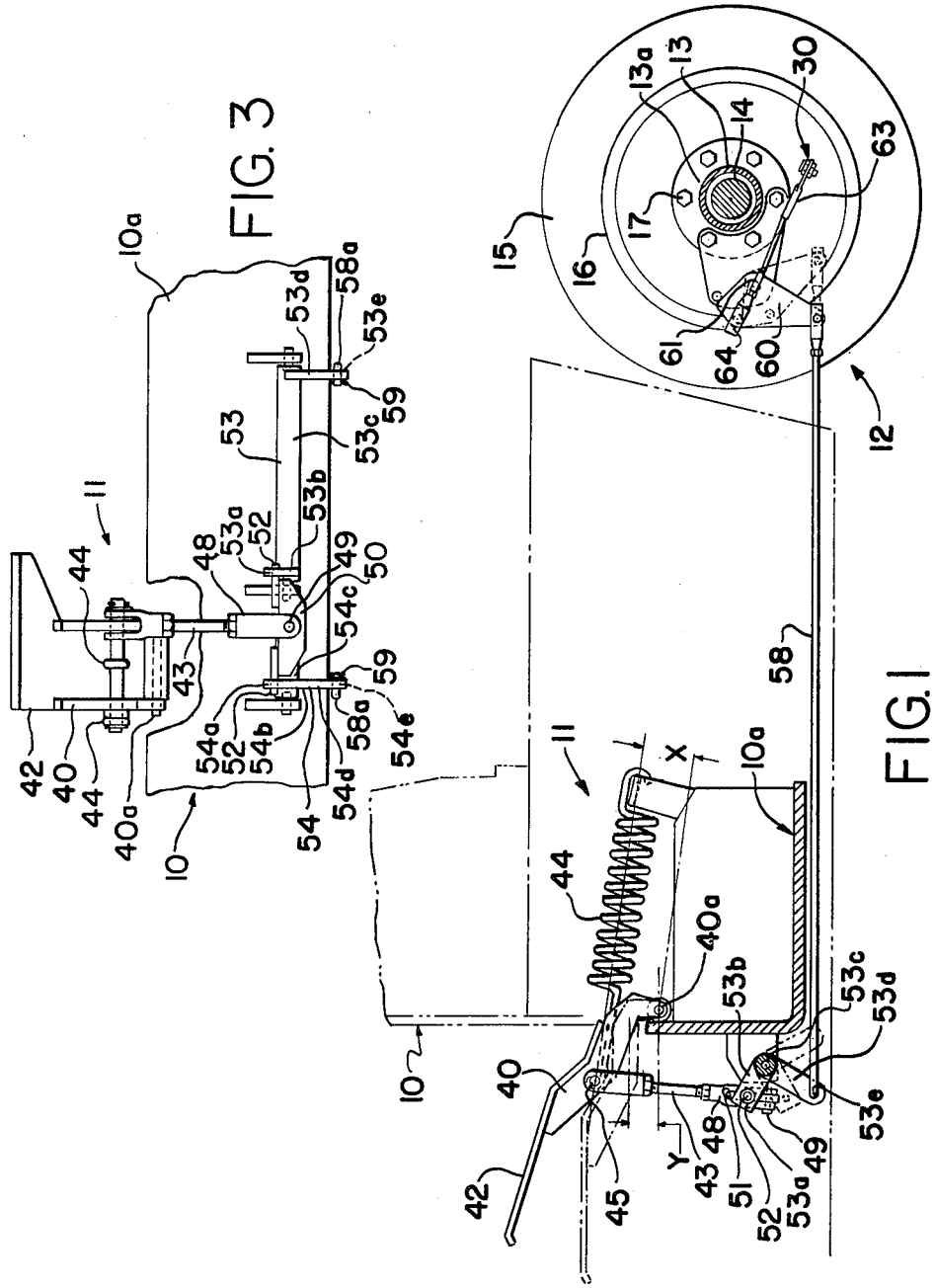

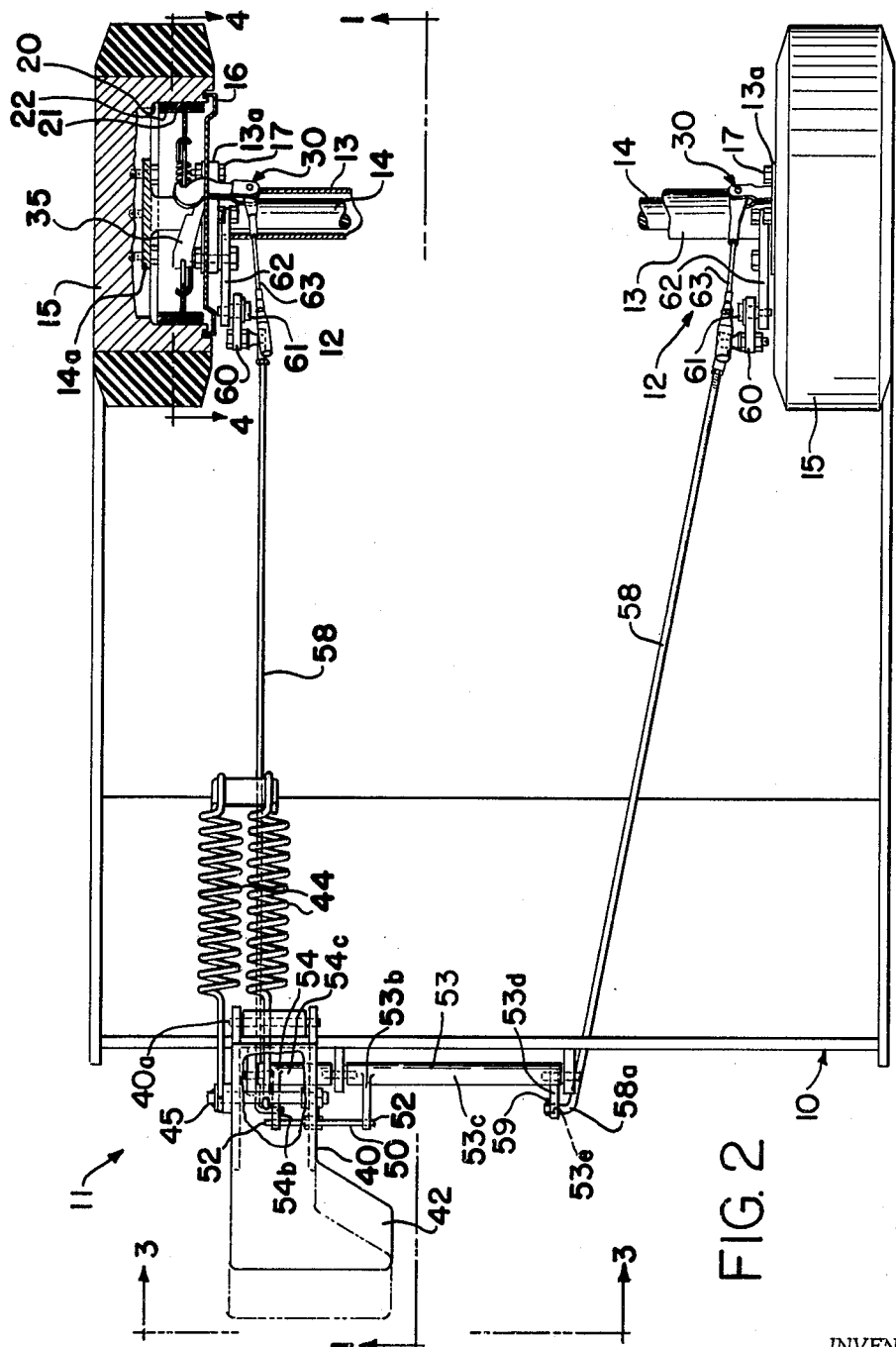

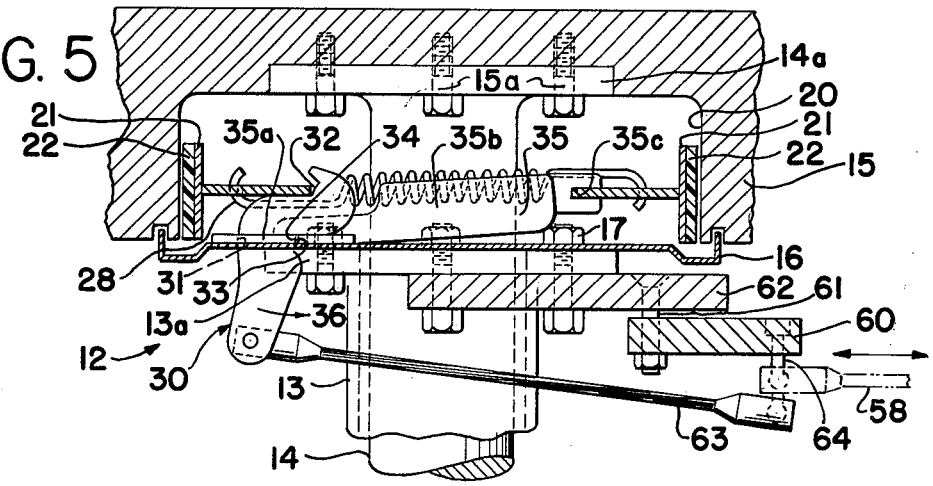
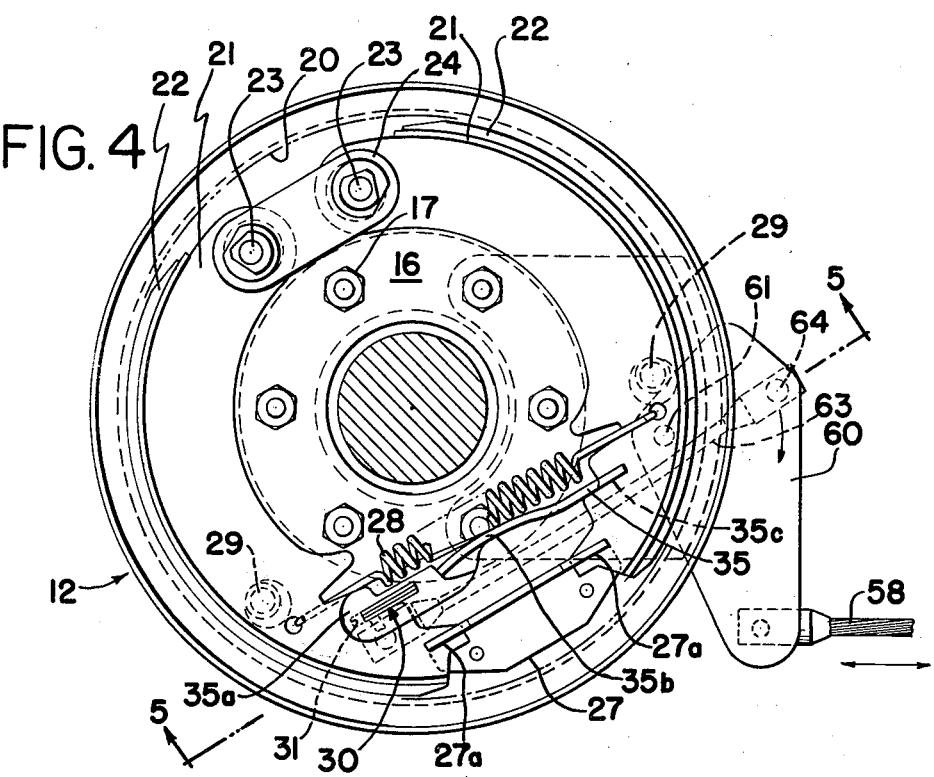

3,190,401
SPRING APPLIED BRAKE CONTROL LINKAGE
Clifford C. Bigley and Arthur E. Dahlquist, Minneapolis, Minn., assignors to Minneapolis-Moline, Inc., Hopkins, Minn., a corporation of Delaware
Filed Mar. 11, 1963, Ser. No. 264,132
3 Claims. (Cl. 188—167)

The present invention relates to control systems, and more particularly to a control system for brake mechanisms and the like, although the control system according to the present invention may also be utilized for controlling other mechanisms such as clutches and the like.

In industrial vehicles such as lift trucks, tractors, and the like, it is common to provide a control system for operating a brake or clutch mechanism which is normally engaged and which is disengageable olny upon actuation of the control system by the operator. This provides a "dead man" means for holding the vehicle stationary when the control system is not actuated so that an operator may dismount and leave the vehicle without fear that it will roll or move. Heretofore, it has been common on commercially available vehicles to require the same or greater force to hold the brake pedal down or released compared with the force initially required to release the brake. Since the control system must continuously be actuated during operation of the vehicle; i.e., the brake pedal must be depressed during running condition of the vehicle where the mechanism is used to control the brakes of the vehicle, the force required to hold the brake off or disengaged while at the same time providing sufficient force to operate the brakes when the pedal is released contributes to fatigue of the opeartor.

As is common in industrial vehicles such as litf trucks, the operator's platform including counterweights forms one separable portion of the vehicle; the engine and drive assembly form another portion of the vehicle separable from the frame thereof in order to facilitate repair and maintenance. Accordingly, it is desirable to provide for disassembly of the counterweight, motor and drive assembly, and frame portions.

Accordingly, it is an object of the present invention to provide a new and improved control system for a brake and the like which overcomes the aforementioned difficulties.

Yet a further object of the present invention is to provide a new and improved control system for a brake of an industrial truck and the like wherein the force nesessary to hold the brake pedal in a released position is greatly reduced during depression of the pedal.

A further object of the present invention is to provide a new and improved control system for a brake and the like wherein the force required for maintaining the system in disengagement is less than that required to initiate the disengagement, thereby reducing the operator fatigue when it is required to maintain the mechanism and the disengaged condition for a long period of time.

Another object of the present invention is to provide a new and improved control system for a brake and the like wherein the control system provides the biasing force for maintaining the brake in the engaged condition.

Yet another object of the present invention is to provide a new and improved control system for an industrial brake and the like for use with two or more brakes in which the biasing force of the system is equalized between the mechanisms automatically independently of the differences in adjustment between the mechanisms.

A still further object of the present invention is to provide a new and improved control system for a brake and the like wherein the control system can be rapidly and easily disconnected from the vehicle to facilitate maintenance of the system, mechanism, and vehicle.

Further objects and advantages of the present invention will become apparent as the following description proceeds and the features of novelty which characterize the invention will be pointed out with particularity in the claims annexed to and forming a part of this specification.

In accordance with these and other objects, there is provided a new and improved control system for controlling a normally engaged brake or other mechanism on vehicles or machinery. The control mechanism for a brake includes a control member such as a brake control pedal, having one end pivotally attached to the frame of the vehicle and the other end adapted to be engaged by the operator as, for example, depression of a pedal on the brake lever. Brake setting means, such as tension spring means, is provided with one end attached to the frame of the vehicle and the other end secured to the brake lever intermediate its ends. The spring is effective for continuously biasing the brake lever in a direction opposite to that in which the lever is moved when the operator applies force to the control member, and in a direction to apply or engage the brake. Moreover, the spring is connected to the vehicle at a point approaching an in-line position with the pivot point of the brake lever when the brake lever is depressed so that due to the short force arm through which the spring acts on the brake lever when the brake pedal is depressed, the load on the brake pedal is significantly reduced upon depression of the brake pedal. Moreover, when the brake pedal is released, the spring is effective to exert a substantial brake setting force to the pedal by acting through a greater moment arm to apply or engage the brake.

When two or more brakes or other mechanisms are to be controlled by the system, the linkage means includes a pair of control rods each having one end attached to the actuating arm of the mechanism and the other end interconnected to the control member through a single actuating rod centrally pivotally attached thereto for balancing the forces applied to the brakes by the brake setting springs.

For a better understanding of the present invention, reference may be had to the accompanying drawing, in which:

FIG. 1 is a sectional elevational view of the control system in accordance with the present invention as it is applied to a vehicle for controlling the brake wheel mechanism of the vehicle;

FIG. 2 is a top plan view of the control system and brake mechanism of FIG. 1;

FIG. 3 is a partial elevational view of the improved control system taken substantially along line 3—3 of FIG. 2;

FIG. 4 is an enlarged sectional view of the brake mechanism controlled by the present control system, and taken substantially along line 4—4 of FIG. 2; and FIG. 5 is a sectional view of the brake mechanism of FIG. 4 taken along line 5—5 of FIG. 4.

Referring now to the drawings, there is illustrated a machine, here fragmentarily illustrated as an industrial vehicle 10 such as a lift truck, employing a control system 11 for controlling desired mechanisms and, specifically, for controlling the service brake 12 of the vehicle 10. The vehicle 10 includes a separable counterweight and operator platofrm (not shown), a frame section 10a, and an engine and drive assembly. As is conventional with vehicles 10 of the type illustrated, the vehicle contains a rear axle housing 13 enclosing a pair of motor driven drive axles 14 which support a pair of drive wheels 15. The drive wheels 15 are secured to an outer flange 14a of the axle 14 in any suitable manner as by a plurality of bolts 15a. Moreover, the outer ends of the axle housing 13 are provided with housing flanges 13a to which is mounted a brake cover plate 16 in any suitable manner as by a plurality of bolts 17.

The vehicle 10 is provided with a conventional set of normally-set wheel brakes 12 and, more particularly, to this end each of the wheels is provided with an inner cylindrical surface forming a brake drum 20. A pair of brake shoes 21 having their outer surface lined with suitable brake lining 22 are provided for frictionally engaging the brake drum 20 to apply the brakes 12 of the vehicle. The brake shoes 21 are supported from the brake plate 16 at one end by means of pins 23, FIG. 4, and a connecting linkage 24 so that the shoes 21 may move outwardly to engage the brake drum 20. The opposite end of the brake shoes 21 are supported in slots 27a provided in a bracket 27 attached to the brake plate 16 to accommodate movement of the brake shoes 21 relative to the brake plate 16 as they are engaged and disengaged with the brake drum 20. These ends of the shoes are biased toward one another by means of a coiled tension spring 28 which is effective to prevent the brake shoes 21 from dragging against the brake drum 20 when the brakes are in a released position. The brakes 12 may be provided with conventional centering means for the shoes 21 thereof, generally, illustrated at 29.

In order to apply or engage the brakes, there is provided an actuating arm 30 which extends through a slot 31 provided in the brake plate 16. The inner end of the arm is provided with a surface 32, FIG. 5, which engages the left-hand brake shoe as viewed in FIGS. 4 and 5, and another intermediate surface 33 which engages the end of a slot 34 defined in a sliding actuating bracket 35. The bracket 35 includes a vertical portion 35a in which the slot 34 is defined, which slidably abuts the internal surface of the brake plate 16. The bracket 35 also includes an elongated portion 35b generally normal to the portion 35a. The portion 35b serves as a guide for the spring 28 and is provided with a slot 35c in which the right-hand one of the brake shoes 21 is engaged.

Referring now specifically to FIG. 5, when the outer end of the actuating arm 35 is moved to the right as indicated by an arrow 36, the surface 32 moves the lower end of the left-hand one of the brake shoes 21 leftward and the surface 33 moves the sliding bracket 35 rightward causing the lower end of the right-hand one of the brake shoes 21 to move to the right and thus applying the brakes by frictionally engaging the brake linings 22 against the brake drum 20. When the force causing the arm 30 to move in the direction of the arrow 40 is relaxed, the spring 28 biases the lower ends of both brake shoes 21 toward one another, disengaging or releasing the brakes.

Referring now to the improved control system for the brakes 12 according to the present invention, as best illustrated in FIGS. 1, 2, and 3, there is provided the control system 11 operatively connected to the actuating arm 30 of the brakes 12 by suitable connecting linkage. The control system 11 is illustrated in the brake-set position in FIGS. 1 and 2, in solid, and is illustrated in phantom in the brake-released position with the brake pedal thereof depressed by the operator of the vehicle. The control system 11 includes a brake lever 40 pivotally attached at one end 40a to a fixed member of the frame 10a of the vehicle 10. The outer end of the brake lever 40 is provided with a brake plate or brake pedal 42 adapted to be depressed by the foot of the operator of the vehicle 10 as he stand on the driving platform of the vehicle. A brake actuating rod 43 is pivotally attached intermediate the ends of the brake lever 40 and has its other end operatively connected with suitable brake actuating linkage. Moreover, a pair of coiled tension brake-setting springs 44 is provided which has one end thereof connected to the brake lever at an intermediate point thereon, indicated as 45 in FIGS. 1 and 2. The other ends of the brake springs 44 are attached to a fixed portion of the vehicle frame 10a at a point generally horizontally spaced from the brake lever pivot point 40a. These springs 44 supply the force to normally engage the brake shoes 21 against the brake drums 20 to brake or lock the wheels 15. When the brake lever 40 is in an unactuated position, the springs 44 act on the lever 40 through a relatively large force or crank arm, indicated by $x$ in FIG. 1, to apply a rather substantial brake-setting force to the brake 12 of the vehicle 10, over-riding the releasing force of the springs 28. On the other hand, although the springs 44 initially exert a great force on the brake lever 40 so that a large force initially is required by the operator on the brake pedal 42 to unlock the brake mechanism to allow the wheels 15 to turn, thereafter the springs 44 move with a sort of toggle action toward the dead-center position of the lever pivot point 40a so that the force of action of the springs 44 approaches an in-line position with the pivot point 40a of the brake lever 40. Once the brake pedal 42 has been depressed, the springs 44 act through a greatly reduced force arm, indicated by $y$ in FIG. 1, and the force required to maintain the brake pedal 42 in the depressed position and, consequently, to maintain the brakes 12 released, diminishes during depression of the pedal 42 because of the shortening of the moment arm between the line of force of the springs 44 and the brake pedal pivot point. Consequently, this results in a reduction of the force required of the operator to maintain the pedal 42 depressed since the moment arm between the downward force on the pedal and the pedal pivot point is nearly constant and, in fact, may actually increase slightly.

Linkage connects the brake actuating rod 43 with the actuating arm 30. As illustrated, mechanism is provided which equalizes the force applied to each of the brakes 12 in the respective wheels 15 regardless of the relative adjustment of the brakes. More specifically, the actuating arm 43 is provided with a clevice 48 at its free end remote from the brake lever 40. The device 48 is provided with a fixed pivot pin 49 pivotally connected to an elongated equalizing member 50. The pin 49 is adjustably positionable in a slot 51 in the clevice 48 to provide for adjustment of the brake lever 40. The equalizing member 50 is an elongated leverlike member provided at each end with a pin 52 which extends loosely into holes 53a and 54a in respective brake control members 53 and 54. The control members 53 and 54 are each coaxially mounted for independent rotation relative to the frame 10a of the vehicle 10. Each of the brake control members 53 and 54 contains a first arm 53b, 54b forming a crank arm extending from a shaft 53c, 54c, respectively, pivotally mounted to the frame 10a. Moreover, each of the brake control members 53 and 54 are provided with respective brake arms, serving as crank arms, indicated at 53d, 54d. It will be seen that the crank arms 53b and 53d are laterally offset, while the crank arms 54b and 54d are generally aligned.

In operation, depression of the brake actuating rod 43 is effective to rotate the crank arms 53d and 54d thereby to transmit the brake releasing and applying force to the brakes 12. Any differences in adjustments of the brakes will be absorbed by slight tilting of the equalizing member 50 about the clevice pin 49. Moreover, the pins 52 fit loosely in the holes 53a, 54a, to provide an over-travel of the brakes in their released position so that each brake 12 will completely release when the pedal is depressed.

To interconnect the brake control members 53 and 54 with the brake 12, there is provided a pair of brake rods 58 each of which has one end bent into a projection 58a extending generally perpendicularly to the remainder of the brake rods 58 and passing through openings 53e, 54e in the crank arms 53d and 54d. Cotter pins 59, FIG. 3, lock the rod projections 58a for rotatable movement in the crank arms 53d and 54d.

Advantageously, in accordance with the present invention, the pedal mechanism of the present brake system is separate from the counterweight portion of the vehicle 10 which forms the operator's platform and is mounted to the frame 10a of the vehicle. Accordingly, without any disassembly of the brake pedal mechanism, the counterweight and platform section can be removed; and by pulling the two cotter pins 59 in the brake rods 58, the engine and drive assembly can be separated from the frame 10a without further disassembly of the brake system.

The brake rods 58 have their other ends connected to a crank arm 60, which in turn is pivotally mounted about a pivot pin 61 to a bracket 62 connected to the flange 13a of the axle housing 13 by some of the bolts 17 which hold the brake plate 16 to the axle housing 13. A flexible cable 63 has one end pivotally connected to a pivot pin 64 secured to the crank arm 60 and has its other end connected to the actuating arm 30 for controlling the application of the brakes 12.

From the above detailed description, it is believed that the operation of the control system for the brakes of the vehicle is clear. However, briefly, it will be understood that with the brake pedal 42 released, as shown in solid in the drawings, the brakes 12 are set to provide a deadman condition. In this position the brake setting springs 44, acting through a moment arm $x$, FIG. 1, are effective to bias the brake lever 40 clockwise about its pivot point 40a. This, in turn, biases the brake actuating rod 43 upwardly to bias the equalizing member 50 upwardly. The equalizing member 50 is free to tilt about the clevice pin 49 and through its associated pins 52 will bias the brake control members 53 and 54 clockwise, as viewed in FIG. 1. It is undersood that in this position the pins 52 are biased against the top of the opening 53a, 54a. Clockwise rotation of the brake control members 53 and 54 biases the brake rods 58 to the left, as viewed in FIG. 1, in turn biasing the flexible cable 63 to the left. The pull of the cable 63 is effective to apply the brakes 12 by biasing the actuating arm 30 in a counterclockwise direction as viewed in FIG. 5, the surface 32 biasing the left-hand one of the brake shoes 21 into frictional engagement with the brake drum 20, while the surface 33, acting through the bracket 35 biases the right-hand one of the brake shoes 21 into frictional engagement with the brake drum 20. The force of the brake spring 44 overpowers the return force of the spring 28, thereby to positively set the brakes 12.

When it is desired by the operator to move the vehicle, the brakes 12 are released by depression and holding of the brake pedal 42. Such depression of the brake pedal 42 is effective to pivot the brake lever 40 counterclockwise about its pivot point 40a against the pull of the springs 44. At initial depression of the brake pedal 42, the spring 44 is acting through a comparatively large moment arm indicated by $x$ in FIG. 1; however, continued depression of the brake pedal 42 decreases the moment arm of the spring 44 until, with the brake pedal 42 in the fully depressed position as indicated in phantom in FIGS. 1 and 2, the springs 44 act through a relatively short moment arm $y$, FIG. 1. This depression of the brake pedal 42 is effective to release the hold on the brake control members 53 and 54, releasing the pull on the brake rod 58 and the flexible cable 63 so that the springs 28 are effective to pull the brake shoes 21 out of engagement with the brake drum 30. The loose fit between the pins 52 and the holes 53a and 54a assures complete release of the brake shoes.

It will be appreciated that in the control system according to the present invention, there is provided a spring-set brake having a sort of toggle- or dead-center action so that while a force sufficient to positively set the brake may be applied to the system when the brake pedal is released and during initial depression of the brake pedal; once the brake has been depressed the reduction in the moment arm of the brake actuating springs 44 reduces the force required to hold the brake off by reducing the torque applied to the brake lever thereby reducing the leg fatigue of the operator. Moreover, because the springs 44 are permitted to function through a larger moment arm when the brake pedal is released, a substantial torque is applied to the brake lever 40 to positively set the brakes.

Although the present invention has been described by reference to only a single embodiment thereof, it will be apparent that numerous other modifications and embodiments may be devised by those skilled in the arts and it is intended by the appended claims to cover all modifications and embodiments which will fall within the true spirit and scope of the present invention.

What is claimed as new and desired to be secured by Letters Patent of the United States is:

1. A control mechanism for controlling the rotation of a rotary member relative to a fixed member, comprising, friction means for normally engaging said rotary member for preventing rotation thereof, lever means having one end pivotally mounted on said fixed member for pivotal movement about a first axis between a set position wherein said friction means engages said rotary member and a released position wherein said friction means is disengaged with said rotary member, said lever means provided with operating means at the other end adapted for manual engagement by an operator to move said lever means to said released position, linkage means connected between a pivot axis intermediate the ends of said lever means and said friction means, means for controlling the engagement thereof with said rotary member in response to the position of said lever means, and biasing means remote from said friction means and said rotary member having one end pivotally connected to said lever means at a first point intermediate the ends thereof and having its other end connected to said fixed member at a second point located on a line extending through said first point and passing close to said first axis when said lever means is in one of said positions, which line is movable farther from said first axis when said lever means is in said the other of said position for increasing the moment of said biasing means on said lever means during movement of the latter between said two positions.

2. A brake control mechanism for controlling a brake of an industrial vehicle and comprising brake drum means, brake means for engagement with said brake drum means, said brake means movable between a brake set position and a brake release position, a brake lever remote from said brake drum means and brake means having one end pivotally mounted on the vehicle and provided with manual operating means at the other end, said brake lever pivotally movable about a first axis between a first position corresponding to one of the first-mentioned positions and a second position corresponding to the other of said first-mentioned positions, linkage means having one end pivotally connected to said brake lever intermediate the ends thereof and an opposite end connected to said brake means for controlling the engagement of said brake means in response to the position of said brake lever and said brake drum means, and spring means disposed remotely from said brake drum means and said brake means and having one end operatively connected to said brake lever at a first point intermediate its ends, means connecting the other end of said spring means to said vehicle at a second point located on a line passing through said first point and also passing close to said first axis when said brake lever is in one of the last two-mentioned positions providing a relatively short moment arm for said spring means and which line moves more remotely from said first axis when said brake lever is in the other of said last two-mentioned positions providing a greater moment arm for said spring means so disposed.

3. A brake control mechanism for controlling a normally set brake at an industrial vehicle, a brake lever having one end pivotally mounted to the vehicle and provided with pedal means at the other end for depression by an operator, said lever movable about a pivot axis between a first position corresponding to a set position of said brake and a second position corresponding to a released position of said brake, linkage means connected to said brake lever intermediate the ends thereof and connected to said brake for controlling the release and setting of said brake in response to the position of said brake lever and spring means remote from said brake having one end pivotally connected to said brake lever at a first point intermediate its length, said spring means having its other end connected to said vehicle at a second point located on a line passing through said first point and also passing close to said pivot axis when said brake lever is in said second position providing a relatively short moment arm for said spring means acting on said brake lever, said line movable more remotely from said pivot axis when said brake lever moves to said first position providing a relatively longer moment arm for said spring means acting on said lever to set said brake.

References Cited by the Examiner
UNITED STATES PATENTS

| | | | |
|---|---|---|---|
| 429,709 | 6/90 | Wilson | 188—167 |
| 1,236,847 | 8/17 | King | 188—119 |
| 1,379,111 | 5/21 | Lucand | 188—204 |
| 1,495,919 | 5/24 | Merritt | 188—119 |
| 1,807,707 | 6/31 | Rouanet | 188—204 |
| 1,959,878 | 5/34 | Schroeder | 188—167 X |
| 2,062,167 | 11/36 | Dieter | 188—294 X |
| 2,161,334 | 6/39 | Carwardine | 188—167 |

FOREIGN PATENTS 891,368  12/43  France.

EUGENE G. BOTZ, *Primary Examiner.*
DUANE A. REGER, ARTHUR L. LA POINT,
*Examiners.*

UNITED STATES PATENT OFFICE
CERTIFICATE OF CORRECTION

Patent No. 3,190,401 June 22, 1965

Clifford C. Bigley et al.

It is hereby certified that error appears in the above numbered patent requiring correction and that the said Letters Patent should read as corrected below.

Column 6, line 11, after "comprising" strike out the comma; line 38, strike out "and"; line 67, strike out "so disposed"; same column 6, line 69, for "at" read -- of --; column 7, line 3, after "lever" insert a comma.

Signed and sealed this 16th day of November 1965.

(SEAL)
Attest:

ERNEST W. SWIDER
Attesting Officer

EDWARD J. BRENNER
Commissioner of Patents